J. H. WHITLEY.
Enlarging Photographic Pictures.
No. 31,060.
Patented Jan'y 1, 1861.
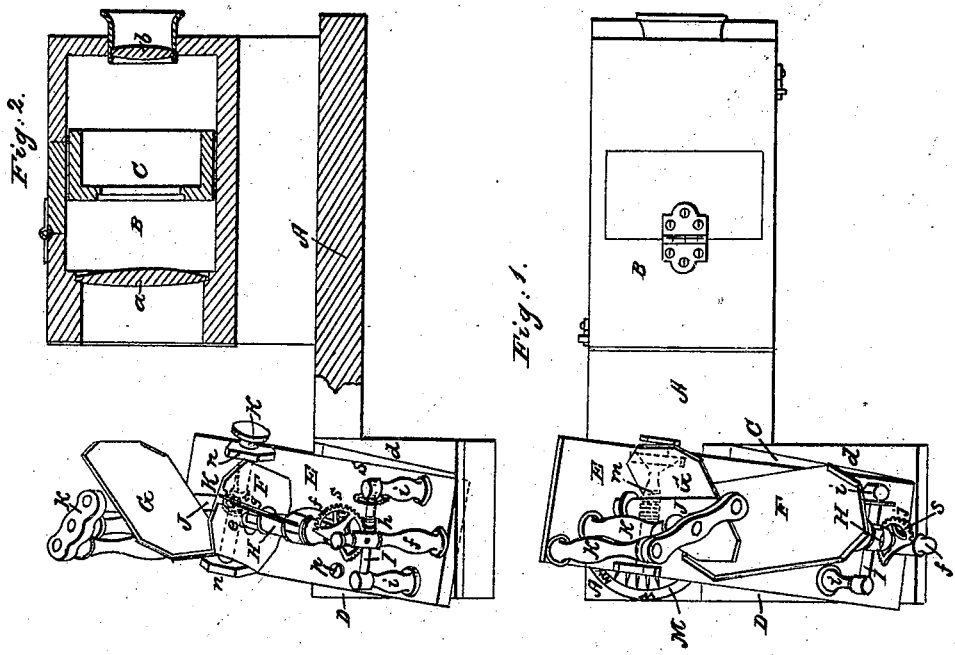
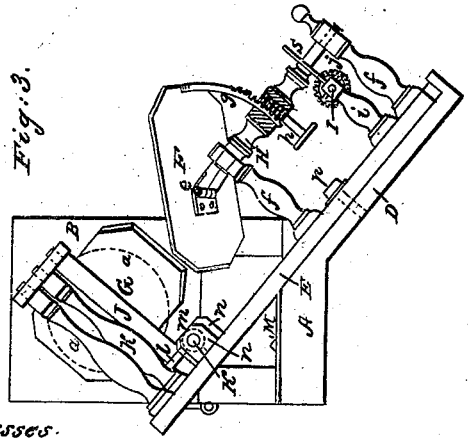

UNITED STATES PATENT OFFICE.

JOHN H. WHITLEY, OF OWEGO, NEW YORK, ASSIGNOR TO HIMSELF AND C. S. CARMICHAEL, OF SAME PLACE.

APPARATUS FOR ENLARGING PHOTOGRAPHIC PICTURES.

Specification of Letters Patent No. 31,060, dated January 1, 1861.

*To all whom it may concern:*

Be it known that I, JOHN H. WHITLEY, of Owego, in the county of Tioga and State of New York, have invented a new and useful Improvement in Apparatus for Enlarging Photographic Pictures; and I do hereby declare that the following is a full, clear, and exact description of the same, reference being had to the accompanying drawing, forming a part of this specification, in which—

Figure 1, is a plan of an apparatus constructed according to my invention. Fig. 2, is a side elevation of the same partly in section. Fig. 3, is a rear view of the same.

Similar letters of reference indicate corresponding parts in the several figures.

The object of this invention is to obtain from photographic negatives of a given size, positive pictures of a much larger size.

The invention relates to the employment of mirrors to reflect the direct rays of the sun through the camera containing the negative, and it consists in so applying and operating a system of mirrors or reflectors in combination with the camera, whereby notwithstanding the movement of the earth upon its axis, the rays of light will continue to be reflected in the same direction for as long a time as may be necessary to obtain the print, and distortion of the picture will be prevented.

To enable others skilled in the art to make and use my invention, I will proceed to describe its construction and operation.

A, is a horizontal bed-piece or platform of wood or other material upon which the camera B, is supported with the axis of its lenses, $a$, $b$, in a horizontal position.

$a$, is the condensing lens, arranged near the back of the camera, and $b$, is the object glass in the usual position.

C, is the plate holder in which the negative is held, placed between the two lenses in a vertical position.

At the rear end of the bed-piece A, there is secured an inclined plane D, the direction of whose inclination is such that if the rear of the platform and camera be toward the west the descent will be toward the south. The degree of inclination of the plane D, is equal to the degree of latitude in which the instrument is to be used, for instance in 40° north latitude the inclination will be 40° to the horizon and in 20° north latitude the degree of inclination will be 20° to the horizon.

E, is a parallel sided board which is bolted to the inclined plane D, by means of a bolt $p$, upon which it is capable of turning for adjustment. To this board are secured the two mirrors F, and G. The mirror F, is hinged by a hinge $e$, to one end of a shaft H, which is fitted to bearings in standards $f$, $f$, erected upon the board E, the axis of the said shaft being parallel with the surfaces of the board E, and inclined plane D, and also with the edges of the board E, and the said mirror is capable of adjustment at different degrees of obliquity to the said shaft by means of a toothed sector $g$, hinged to its back and passing through a slot in the shaft, and a screw $h$, having a journal fitted to turn in the shaft and having its thread fitted to the teeth of the sector. The shaft H, has rigidly secured to it a concentric toothed sector $s$, which gears with an endless screw $h'$, on a transverse shaft I, arranged in bearings in standards $i$, $i$, secured to the board E. This shaft I, is intended to be moved by clockwork one of the wheels of which, marked $j$, is represented on the said shaft. The mirror G, is carried by a shaft J, which is arranged to work in a bearing in the board E, and another bearing in a standard $k$, erected on said board, the axis of said shaft being in perpendicular to the board E, and plane D, and in the same plane with the axis of the shaft H, and the face of the mirror G, being parallel with the said shaft J. The said shaft J, has rigidly secured to it a concentric toothed sector $l$, which gears with an endless screw $m$, on a horizontal shaft K, which works in bearings in standards $n$, $n$, secured to the board E. This shaft K, is to be turned by hand for the adjustment of the mirror G.

The front edge of the board E, bears against a movable taper strip $c$, which rests upon the inclined plane D, close against a fixed strip $d$, which is secured to the front part of the said inclined plane. The rear side of the strip $d$, against which the strip $c$, rests forms an angle with the line of direction of the descent of the plane equal to 11°, 45′, minus the variation of the compass, where the needle is used. The sides of the taper strip $d$, form an angle with each other equal to that of the variation of the sun's course from a plane parallel with the equator.

On the extreme rear of the platform A, there is a compass M, having its card fixed with its east and west points parallel with the axis of the camera lenses and the south point toward the inclined plane D.

The apparatus is used in the following manner. When the sun has a northern declination, the piece c, against which the front side of the board E, rests should be placed against the piece d, with its smaller end upward, but when it has a southern declination it should be placed with its larger end upward as shown. This is of course supposing the apparatus to be used in the northern hemisphere, but in the southern hemisphere the arrangement would require to be reversed. The horizontal bed-piece A, with the board E, and mirrors attached is placed in a window with the inclined plane D, outside, and its lower end adjusted by the compass M, exactly toward the south. The camera is then put on the bed-piece, the direction of the axis of its lenses being east and west, the condensing lens being toward the outside. The lower mirror F, whose shaft H, is now parallel with the plane of the earth's motion on its axis, is to be adjusted by its screw h, and sector g, so that the sun's rays will be reflected by it in a direction parallel with its shaft, and the mirror G, is then adjusted by its screw m, to receive the reflected rays from F, and throw them through the condensing lens a, and object glass b, upon the screen within the dark room. The clock work, which by gearing with the wheel j, drives the shaft H, at the proper speed relatively to the motion of the earth on its axis, is then set in motion, and the negative put in the camera when the rays reflected by the mirrors F, G, through the camera and the negative, will form an image on the paper or other material, upon the screen within the dark room and the movement of the mirror F, will preserve the proper direction of the rays as the earth moves (apparently the sun), and insure a perfect picture.

The example of my invention represented and described, is for use in a window which nearly faces the west, but for a room which faces the south, the instrument would have to be so far modified that the inclined plane D, would have to range with the length of the platform instead of transversely thereto, as in the example; and in that case, the mirror G, would be attached to a horizontal shaft to cause the reflection of the rays in a northerly direction.

What I claim as my invention, and desire to secure by Letters Patent, is.

So applying and operating a system of mirrors or reflectors in combination with a camera that by the movement of one of the mirrors the rays of the sun may continue to be reflected in the same direction through the camera for as long time as may be necessary to obtain a print, substantially as herein described.

JOHN H. WHITLEY.

Witnesses:
   E. BEEMAN,
   P. R. GOODRICH.